United States Patent
Söllner et al.

(10) Patent No.: US 9,829,593 B2
(45) Date of Patent: Nov. 28, 2017

(54) DETERMINATION OF AN IMPULSE RESPONSE AT A SUBSURFACE IMAGE LEVEL

(71) Applicant: PGS Geophysical AS, Oslo (NO)

(72) Inventors: Walter Franz Söllner, Oslo (NO); Alba Ordoñez, Oslo (NO)

(73) Assignee: PGS Geophysical AS, Oslo (NO)

( * ) Notice: Subject to any disclaimer, the term of this patent is extended or adjusted under 35 U.S.C. 154(b) by 0 days.

(21) Appl. No.: 14/680,526

(22) Filed: Apr. 7, 2015

(65) Prior Publication Data

US 2016/0047927 A1 Feb. 18, 2016

Related U.S. Application Data

(60) Provisional application No. 62/037,254, filed on Aug. 14, 2014.

(51) Int. Cl.
*G01V 1/38* (2006.01)
*G01V 1/30* (2006.01)

(52) U.S. Cl.
CPC ........... *G01V 1/38* (2013.01); *G01V 1/301* (2013.01); *G01V 2210/1293* (2013.01); *G01V 2210/1423* (2013.01); *G01V 2210/1427* (2013.01); *G01V 2210/45* (2013.01); *G01V 2210/512* (2013.01); *G01V 2210/64* (2013.01); *G01V 2210/67* (2013.01)

(58) Field of Classification Search
CPC .................. G01V 1/38; G01V 1/301
See application file for complete search history.

(56) References Cited

U.S. PATENT DOCUMENTS

| | | | |
|---|---|---|---|
| 4,168,484 A * | 9/1979 | Wright, Jr. | G01S 7/539 367/21 |
| 4,752,916 A * | 6/1988 | Loewenthal | G01V 1/366 367/24 |
| 5,761,152 A | 6/1998 | Jacobsen et al. | |
| 6,763,305 B2 | 7/2004 | Bernitsas | |
| 7,035,737 B2 | 4/2006 | Ren | |
| 7,336,560 B2 | 2/2008 | Rekdal et al. | |
| 7,609,585 B2 | 10/2009 | Jiao et al. | |
| 8,619,497 B1 * | 12/2013 | Sallas | G01V 1/38 367/23 |
| 8,750,072 B2 | 6/2014 | Luo et al. | |
| 2012/0026830 A1 | 2/2012 | Wang et al. | |
| 2012/0307591 A1 | 12/2012 | Hegna et al. | |

(Continued)

OTHER PUBLICATIONS

Ordonez, A., and W. Sollner, 2013, Imaging condition for pressure-normalized separated wavefields: 75th Annual Conference and Exhibition Meeting, EAGE, Extended Abstracts, We 02 04.

(Continued)

*Primary Examiner* — Luke Ratcliffe
*Assistant Examiner* — Hovhannes Baghdasaryan

(57) ABSTRACT

Determination of an impulse response at a subsurface image level can include extrapolation of an up-going pressure wavefield to a subsurface image level, extrapolation of a down-going velocity wavefield to the subsurface image level, and determination of the impulse response at the subsurface image level from a hypothetical seismic source by spectral division of the extrapolated up-going pressure wavefield by the extrapolated down-going velocity wavefield.

20 Claims, 4 Drawing Sheets

(56) References Cited

U.S. PATENT DOCUMENTS

| | | | | |
|---|---|---|---|---|
| 2013/0028048 A1* | 1/2013 | Sollner | ............... | G01V 1/28 |
| | | | | 367/21 |
| 2013/0301387 A1* | 11/2013 | van Groenestijn | .... | G01V 1/368 |
| | | | | 367/46 |
| 2014/0016436 A1* | 1/2014 | Sollner | ............. | G01V 1/364 |
| | | | | 367/24 |
| 2014/0043936 A1 | 2/2014 | Poole | | |
| 2014/0254320 A1 | 9/2014 | Marhfoul et al. | | |

OTHER PUBLICATIONS

Amundsen, L., 2001, Elimination of the free-surface related multiples without need of the source wavelet: Geophysics, 66, 327-341.

Ordonez et al., "Migration of primaries and multiples using an imaging condition for amplitude-normalized separated wavefields," Geophysics, vol. 79, No. 5, Sep.-Oct. 2014, 14 pp.

Wapenaar et al., "Seismic and electromagnetic controlled-source interferometry in dissipative media: Geophysical Prospecting," 56, 419-434, 2008).

* cited by examiner

DETERMINATION OF AN IMPULSE RESPONSE AT A SUBSURFACE IMAGE LEVEL

CROSS-REFERENCE TO RELATED APPLICATIONS

This application claims priority to U.S. Provisional Application 62/037,254, filed Aug. 14, 2014, which is incorporated by reference.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are helpful for quantitative seismic interpretation and improved reservoir monitoring. For a typical marine seismic survey, a marine survey vessel tows one or more seismic sources below the surface of the water and over a subterranean formation to be surveyed for mineral deposits. Seismic receivers may be located on or near the seafloor, on one or more streamers towed by the marine survey vessel, or on one or more streamers towed by another vessel. The marine survey vessel typically contains marine seismic survey equipment, such as navigation control, seismic source control, seismic receiver control, and recording equipment. The seismic source control may cause the one or more seismic sources, which can be air guns, marine vibrators, etc., to produce acoustic signals at selected times. Each acoustic signal is essentially a sound wave called a wavefield that travels down through the water and into the subterranean formation. At each interface between different types of rock, a portion of the wavefield may be refracted, and another portion may be reflected, which may include some scattering, back toward the body of water to propagate toward the surface. The seismic receivers thereby measure a wavefield that was initiated by the actuation of the seismic source.

DETAILED DESCRIPTION

Figure 1:
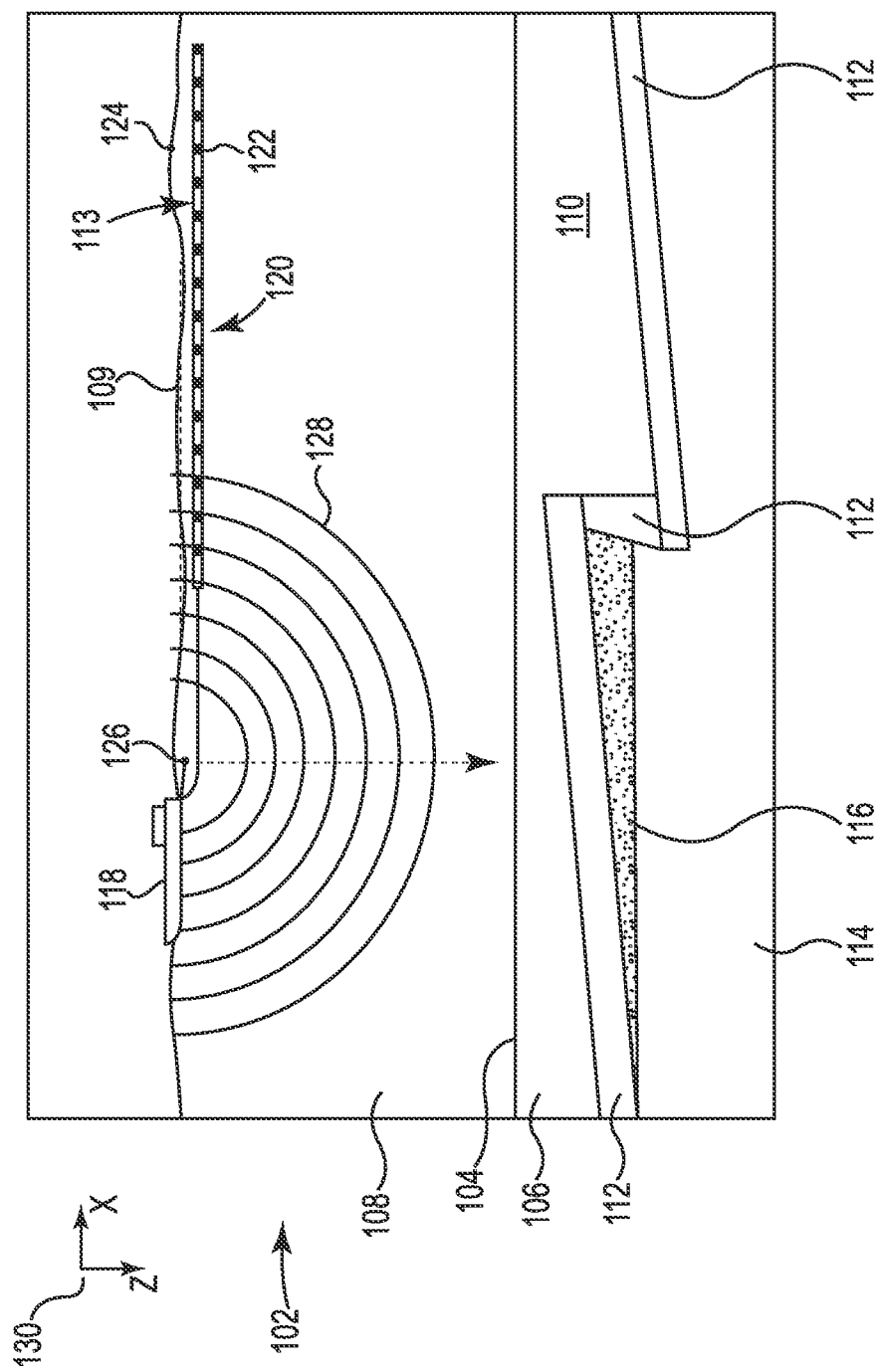
FIG. 1 illustrates an elevation or xz-plane view of marine seismic surveying in which acoustic signals are emitted by a seismic source for recording by seismic receivers for processing and analysis in order to help characterize the structures and distributions of features and materials underlying the solid surface of the earth.

The present disclosure is related to determination of an acoustic impulse response at a subsurface image level within a geological formation. For example, the impulse response can be used to obtain a seismic image of the subsurface or to extract the angle dependent reflectivity at the subsurface image level as described in more detail herein. A subsurface image level is a location in the subsurface within a geological formation that is a target for seismic imaging. A seismic source can emit an acoustic signal. As used herein, a source element is a single source device, such as an air gun or marine vibrator. A source unit is a plurality of source elements that are actuated together. A source array is a plurality of source elements or a plurality of source units that may be actuated separately. As used herein, a "seismic source" refers to one or more single source devices, arranged as a source element, source unit, or source array. The pressure and velocity (e.g., particle motion variation as a function of time and position) caused by an acoustic signal from a seismic source is called the "source wavefield," and may be a pressure wavefield, a velocity wavefield, or a combination thereof. The pressure and particle motion variation as a function of time and position measured by a seismic receiver is called the "receiver wavefield," and may be a pressure wavefield, a velocity wavefield, or a combination thereof.

In complex geology (e.g., subsalt) the wavefields at a subsurface image level may carry propagation effects of an overburden, such as spreading, refraction, internal scattering, etc., which may influence the amplitudes, signal shape, and/or resolution of the seismic image. Propagation effects of a sea surface may include sea surface scattering that may be generated at the sea surface. In order to compensate for amplitude losses due to source illumination and propagation effects, normalization by the power of the source wavefield may be applied in the imaging condition. However, this normalized imaging condition, may not be able to compensate for signal shape variations at the subsurface image level, as caused, for example, by propagation effects of the overburden, such as internal scattering. This may be particularly relevant when the overburden contains significant amounts of salt.

However, according to a number of embodiments of the present disclosure, determination of an impulse response at a subsurface image level can include extrapolation of an up-going pressure wavefield to a subsurface image level, extrapolation of a down-going velocity wavefield to the subsurface image level, and determination of the impulse response at the subsurface image level from a hypothetical seismic source by spectral division of the extrapolated up-going pressure wavefield by the extrapolated down-going velocity wavefield.

However, according to the present disclosure, a seismic image can be obtained by a wavefield extrapolation or propagation and application of an imaging condition. During wavefield propagation, both the source wavefield and the receiver wavefield can be downward propagated in small depth increments. The source wavefield can be forward propagated in time and the receiver wavefield can be backward propagated in time. The imaging condition can include mutli-dimensional spectral division of the two wavefields at small depth increments. In some embodiments, the zero-time lag of the correlation between the two wavefields can be extracted at each depth increment.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 109 may reference element "09" in FIG. 1, and a similar element may be referenced as 209 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 130 view of marine seismic surveying in which acoustic signals are emitted by a seismic source 126 for recording by seismic receivers 122 for processing and analysis in order to help characterize the structures and distributions of features and materials underlying the solid surface of the earth. FIG. 1 shows a domain volume 102 of the earth's surface comprising a solid volume 106 of sediment and rock below the solid surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine seismic surveys. FIG. 1 illustrates a first sediment layer 110, an uplifted rock layer 112, second, underlying rock layer 114, and hydrocarbon-saturated layer 116. One or more elements of the solid volume 106, such as the first sediment layer 110 and the first uplifted rock layer 112, can be an overburden for the hydrocarbon-saturated layer 116. In some instances, the overburden may include salt.

FIG. 1 shows an example of a marine survey vessel 118 equipped to carry out marine seismic surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which seismic receivers may be connected. In one type of marine seismic survey, each seismic receiver, such as the seismic receiver represented by the shaded disk 122 in FIG. 1, comprises a pair of seismic sensors including a geophone that detects particle displacement within the water by detecting particle motion variation, such as velocities or accelerations, and/or a hydrophone that detects variations in pressure. The streamers 120 and the marine survey vessel 118 can include sophisticated sensing electronics and data-processing facilities that allow seismic receiver readings to be correlated with absolute positions on the sea surface and absolute three-dimensional positions with respect to a three-dimensional coordinate system. In FIG. 1, the seismic receivers along the streamers are shown to lie below the sea surface 109, with the seismic receiver positions correlated with overlying surface positions, such as a surface position 124 correlated with the position of seismic receiver 122. The marine survey vessel 118 can also tow one or more seismic sources 126 that produce acoustic signals as the marine survey vessel 118 and streamers 120 move across the sea surface 109. Seismic sources 126 and/or streamers 120 may also be towed by other vessels, or may be otherwise disposed in fluid volume 108. For example, seismic receivers may be located on ocean bottom cables or nodes fixed at or near the solid surface 104, and seismic sources 126 may also be disposed in a nearly-fixed or fixed configuration.

FIG. 1 shows an expanding, spherical acoustic signal, illustrated as semicircles of increasing radius centered at the seismic source 126, representing a down-going wavefield 128, following an acoustic signal emitted by the seismic source 126. The down-going wavefield 128 is, in effect, shown in a vertical plane cross section in FIG. 1. The outward and downward expanding down-going wavefield 128 may eventually reach the solid surface 104, at which point the outward and downward expanding down-going wavefield 128 may partially scatter, may partially reflect back toward the streamers 120, and may partially refract downward into the solid volume 106, becoming elastic acoustic signals within the solid volume 106.

A desired image level may be below an overburden in the hydrocarbon-saturated layer 116. Some embodiments of the present disclosure can include correction of amplitude versus angle artefacts due to non-uniform signal amplitudes and signal shapes at subsurface image levels. Such artefacts may include reflection zones in the subsurface that cause illumination variation at the subsurface image level due, for example, to scattering of the down-going wavefield 128 above the subsurface image level. Some embodiments can include determining an impulse response at the subsurface image level.

Figure 2:
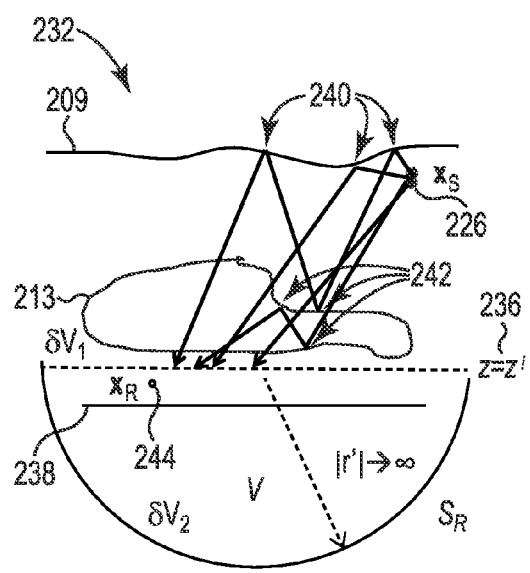
FIG. 2 illustrates an elevation or plane view of an actual state representing marine seismic surveying in which acoustic signals are emitted by a seismic source.

FIG. 2 illustrates an elevation or plane view of an actual state 232 representing marine seismic surveying in which acoustic signals are emitted by a seismic source 226. FIG. 2 also illustrates a hypothetical seismic receiver 244 in the subsurface at location $x_R$ where it may be impractical to use an actual seismic receiver. Some embodiments can include estimation of the impulse response at a subsurface image level 238 by employing reciprocity in two different states of an acoustic model. Considering propagation effects 240 at the sea surface 209 above the seismic source 226, propagation effects at the sea bottom (not specifically illustrated), and propagation effects 242 at the subsurface, including at the overburden 213, the two different states can be the actual state 232 illustrated in FIG. 2 and the hypothetical state 334 illustrated in FIG. 3.

The actual state 232 illustrated in FIG. 2 refers to the physical seismic experiment where the seismic source 226 is identified by its position $x_S$, where $X=(x, y, z)$. An actual seismic receiver (not specifically illustrated in FIG. 2) consisting of pressure and particle motion variation sensors may be in the marine environment below the seismic source 226. A volume (V) is considered enclosed by a surface characterized by a flat top boundary ($\delta V_1$) chosen as the extrapolation level 236 ($z=z^1$) and a hemisphere ($\delta V_2$) of infinite radius ($|r'| \to \infty$). The acoustic properties of this model can be set to match the medium parameters within and outside V.

A pressure wavefield ($p_A$) and a velocity wavefield ($v_A$) emitted by the actual seismic source 226 can be separated in up-going components and down-going components, where the subscript A indicates the actual state 232. The velocity wavefield can be represented by three orthogonal components. For wavefield extrapolation, in general, an orthogonal component of the velocity wavefield that is normal to the extrapolation surface is used. Where the extrapolation surface is horizontal, the orthogonal component of the velocity wavefield that is normal to the extrapolation surface can be referred to as a vertical velocity wavefield ($v_{zA}$), where the subscript z indicates vertical. Some of the equations described herein refer to a vertical velocity wavefield by the subscript z for ease of notation, however embodiments are not limited to this particular orthogonal wavefield component, as the extrapolation surface need not be horizontal. Therefore, the velocity wavefield is generally referred to herein without reference to "vertical" because it is not limited as such. Thus, the pressure wavefield ($p_A$) and a velocity wavefield ($v_A$) emitted by the actual seismic source 226 can be separated in up-going components (up-going pressure wavefield $p_A^-$ and up-going velocity wavefield $v_{zA}^-$) and down-going components (down-going pressure wavefield $p_A^+$ and down-going velocity wavefield $v_{zA}^+$). In some embodiments, the separation can be modeled at the extrapolation level 236 just above a level of the hypothetical seismic receiver 244. In some embodiments, the separation can be modeled at an acquisition level corresponding to an actual seismic receiver (not illustrated.

After separation of the pressure wavefield and the velocity wavefield, the up-going and down-going wavefields can be extrapolated (e.g., using one-way wave equation techniques) or propagated (e.g., using two-way wave equation techniques) to the extrapolation level 236 as described in more detail herein. As used herein, a wavefield being extrapolated or propagated refers to a modeling technique for manipulating the wavefield rather than physical propagation of the wavefield, unless otherwise indicated. In the actual state 232, the down-going pressure wavefield and down-going velocity wavefield can be modeled as though recorded at the extrapolation level 236, for example, by a number of hypothetical seismic receivers (not specifically illustrated, but indicated by the wave paths pointing down to and ending at the extrapolation level 236). The source distribution for the actual state 232 is $\Sigma s_i \rho^{-1}(x)\delta(x-x_{s_i})$, where $s_i$ is the respective source signature (source wavelet) for each actual seismic source element at $x_{s_i}$ (represented collectively at $x_s$ in FIG. 2) in the actual state 232 and $\delta$ is the Dirac delta function. The Dirac delta function is a distribution on a real number line that is zero except at zero on the real line, where it can be thought of as being infinitely high. The Dirac delta function represents a unit impulse from a monopole point source.

Figure 3:
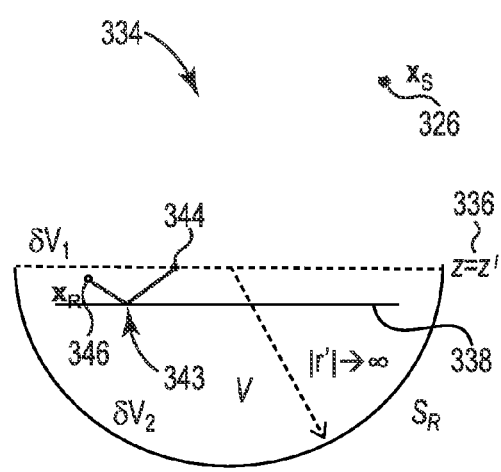
FIG. 3 illustrates an elevation or plane view of a hypothetical state representing marine seismic surveying in which acoustic signals are modeled as though emitted by a hypothetical seismic source and modeled as though recorded by a hypothetical seismic receiver.

FIG. 3 illustrates an elevation or plane view of a hypothetical state 334 representing marine seismic surveying in which acoustic signals are modeled as though emitted by a hypothetical seismic source 346 and modeled as though recorded by a hypothetical seismic receiver 344. The same volume (V) as for the actual state 232 in FIG. 2 can be defined for the hypothetical state 334 in FIG. 3. The hypothetical state 334 corresponds to a desired state where the overburden and the sea surface are replaced by a homogeneous (non-reflective) layer of the same elastic properties as the extrapolation level 336. A hypothetical seismic source 346 is a representation of a seismic source in a location where a seismic source may not actually exist, such as in the subsurface. A hypothetical seismic receiver is a representation of a seismic receiver in a location where a seismic receiver may not actually exist. The extrapolation level 336 in the hypothetical state 334 in FIG. 3 is analogous to the extrapolation level 236 in the actual state 232 in FIG. 2, located at $z=z^1$.

In the hypothetical state 334, the hypothetical seismic source 346 can be located just below the extrapolation level 336 at location $x_R$. The hypothetical seismic receiver 344 can be at the extrapolation level 336 in the subsurface. A pressure wavefield $p_B$ and a velocity wavefield $v_{zB}$ emitted by the hypothetical seismic source 346 may be separated into up-going and down-going components, where the subscript B indicates the hypothetical state 334. In some embodiments, the wavefields may be separated at the extrapolation level 336. For example, the wavefields may be separated in small depth increments (e.g., small laterally homogenous depth increments). In some embodiments, the separation may be performed using amplitude normalization for the pressure wavefield output, in which case the pressure wavefield $p=p^-+p^+$, is expressed by the addition of the up-going ($p^-$) and the down-going ($p^+$) pressure components. In some embodiments, the separation may be performed using amplitude normalization for the velocity wavefield output, in this case the velocity wavefield, $v_z=v_z^-+v_z^+$, is expressed by the sum of the up-going ($v_z^-$) and the down-going ($v_z^+$) velocity components. The source distribution for the hypothetical state 334 is $s^d\rho^{-1}(x)\delta(x-x_R)$, where $s^d$ is the source wavefield for the hypothetical state 334.

In some embodiments, the separation may be performed using flux normalization where the pressure wavefield $$p = \sqrt{\frac{\rho\omega}{2b}}(U+D),$$

and velocity wavefield $$v_z = \sqrt{\frac{b}{2\rho\omega}}(-U+D),$$

are expressed by the up-going (U) and down-going (D) flux components of the wavefield, and where $\rho$ is the density, $\omega$ is the angular frequency, and b is the differential operator, $$b = \sqrt{\frac{\omega^2}{c^2} + \partial^2 x + \partial^2 y},$$

where c is the velocity of sound in water.

In a small source-free depth interval around the extrapolation level 336 at the surface $\delta V_1$, amplitude normalized separation can be used to derive the wavefield identity $\int_{\partial V_1}(p_B v_{zA} - v_{zB} p_A)dS = 2\int_{\partial V_1}(p_B^- v_{zA}^+ + v_{zA}^- p_B^+)dS$, where dS indicates integration over surface (e.g., surface $\delta V_1$).

By setting up reciprocity relations between the actual state 232 and the hypothetical state 334 and using amplitude normalized wavefield decomposition, a relation for calculating the pressure wavefield $p_A(x_R, x_S)$ can be obtained from a surface integral of separated wavefield components of pressure and velocity:

$$-s^d p_A(x_R,x_S) = 2i\omega\rho \int (v_{zA}^+(\chi,z^1|x_s)p_B^-(\chi,z^1|x_R) + v_{zA}^-(\chi,z^1|x_S)p_B^+(\chi,z^1|x_R))d\chi \quad (1)$$

where i is the imaginary unit.

On the right hand side of Equation 1, the second term can be removed, as there may be no down-going wavefield component in the hypothetical state 334 at the extrapolation level 336 for sources below the extrapolation level 336. Seismic source-receiver reciprocity can be applied on the hypothetical state 334 by transforming $p_B^-(X, z^1|x_R)$ into $p_B^-(x_R|X, z^t)$ and the up-going wavefield can be taken on both sides of Equation 1. The desired impulse response (angle dependent reflectivity), $p_B^-(x_R|\chi, z^t)$, at a subsurface image level 338 from the hypothetical seismic source 346 at the extrapolation level 336 can be expressed by the up-going pressure wavefield and the down-going velocity wavefield as, $$-s^d p_A^-(x_R,x_S) = 2i\omega\rho \int v_{zA}^+(\chi,z^t|x_S) p_B^-(x_R|\chi,z^t) d\chi. \quad (2)$$

In Equation 2, $2i\omega\rho$ is a filter that can be applied to the down-going velocity wavefield and may be generally referred to herein as an iw-filter. Assuming sufficient available data, an inversion of the Fredholm integral of Equation 2 at any image level can give the impulse response function.

The down-going velocity wavefield emitted by the actual seismic sources 326 at $x_S$ can be modeled as though recorded at the extrapolation level 336. This wavefield can be multiplied in the frequency domain with the common receiver sorted pressure wavefield with a receiver at the position $x_R$ emitted by hypothetical seismic sources at the separation in the hypothetical state 334. After applying reciprocity, the position $x_R$ becomes the receiver position. The surface integral over the entire surface may be interpreted as finding possible wave path combinations from the actual seismic source 326 to the hypothetical seismic receiver as combinations of wave paths including propagation effects 242 of the overburden (of the actual state 232) and the wave paths including the propagation effects of the subsurface. In this sense, Equation 2 could be used to model the up-going pressure wavefield $p_A^-$, if the filtered down-going velocity wavefield $v_{zA}^+$ and the up-going pressure wavefield $p_B^-$, which is a representation of the angle dependent reflectivity at the subsurface image level 338, are known. However, according to the present disclosure, the former two quantities may be known and an interest is the estimation of the angle dependent reflectivity at the subsurface image level 338. Accordingly, an inversion of the Fredholm integral of Equation 2 can be beneficial, however spectral division may provide a more intuitive understanding and an efficient solution.

Spectral division can aid in understanding the solution if the integrand can be expressed as a (multi-dimensional) convolution. In the hypothetical state 334, translation invariance of the wavefield, $p_B^-(\chi_R, z_R|\chi, z^t) = p_B^-(\chi_R + \chi_S - \chi, z_R|\chi_S, z^t)$ can be used. The wavefield quantities can be unchanged if the hypothetical seismic source 346 and the hypothetical seismic receiver 344 are shifted by the same amount, $\chi_S - \chi$. Using the expression for the translated pressure wavefield, the integrand of Equation 2 can be transformed into a convolution, $$-s^d p_A^-(x_R,x_S) = 2i\omega\rho \int v_{zA}^+(\chi,z^t|x_S) p_B^-(\chi_R|\chi_S-\chi,z_R|\chi_S,z^t) d\chi \quad (3)$$

and the solution may be found by transformation in the spatial Fourier domain. By applying Parseval's identity $$\left( \int d\chi f(\chi' - \chi) h(\chi) = \frac{1}{(2\pi)^2} \int d\kappa F(\kappa) H(\kappa) \exp(i\kappa\chi') \right),$$

where F and H are the Fourier transformations of the functions f and h) in Equation 3, Equation 4 can be obtained:

$$-s^d p_A^-(x_R, x_S) = \quad (4)$$

-continued
$$\frac{2i\omega\rho}{(2\pi)^2} \int v_{zA}^+(\kappa, z^t|x_S) p_B^-(\kappa, z_R|\chi_S, z^t) \exp[i\kappa(\chi_R + \chi_S)] d\kappa.$$

On both sides of Equation 4, a spatial Fourier transform can be applied with respect to $\chi_R$ and after changing order of integrations, Equation 5 can be obtained:

$$-s^d p_A^-(\kappa_R, z_R|x_S) = \frac{2i\omega\rho}{(2\pi)^2} \int \left\{ v_{zA}^+(\kappa, z^t|x_S) \right. \quad (5)$$
$$\left. p_B^-(\kappa, z_R|\chi_S, z^t) \exp[i\kappa\chi_S] \int d\chi_R \exp[i\chi_R(\kappa - \kappa_R)] \right\} d\kappa.$$

In Equation 5, $$\frac{1}{(2\pi)^2} \int d\chi_R \exp[i\chi_R(\kappa - \kappa_R)] = \delta(\kappa - \kappa_R),$$

can be used, and then the up-going pressure wavefield can be obtained by multiplying, in the frequency-wavenumber domain, the filtered down-going velocity wavefield and the impulse response at the subsurface image level 338:

$$-s^d p_A^-(\kappa_R, z_R|x_S) = 2i\omega\rho v_{zA}^+(\kappa_R, z^t|x_S) p_B^-(\kappa_R, z_R|\chi_S, z^t) \exp[i\kappa_R\chi_S]. \quad (6)$$

This operation may be seen as combining, for plane waves at the extrapolation level 336, the filtered down-going wave paths with the corresponding subsurface wave paths into the up-going wavefield. The impulse response at the subsurface image level 338 can be obtained by spectral division (or deconvolution) of the up-going pressure wavefield by the filtered down-going velocity wavefield, in the frequency-wavenumber domain:

$$p_B^-(\kappa_R, z_R|\chi_S, z^t) \exp[i\kappa_R\chi_S] = \frac{-1}{2i\omega\rho} \frac{s^d p_A^-(\kappa_R, z_R|x_S)}{v_{zA}^+(\kappa_R, z^t|x_S)}. \quad (7)$$

The numerator in Equation (7) represents the up-going pressure wavefield (the receiver wavefield in seismic imaging terminology) extrapolated to the subsurface image level 338 and the denominator represents the filtered down-going velocity wavefield (the source wavefield in seismic imaging terminology) extrapolated to the subsurface image level 338. The process of deconvolution by the down-going source wavefield can be interpreted as removing from the up-going wavefield and the down-going wavefield the common wave paths including the source wavefield and the propagation effects of the overburden. This leads to the impulse response function.

Although shift invariance of wavefields in the hypothetical state 334 has been assumed, which can be identical with assuming ID model for the hypothetical state 334, this does not affect the complexity of the overburden in the physical state. Hence, the plane wave deconvolution from Equation 7 can still remove the propagation effects of the overburden and improve the resulting seismic image. The angle dependent reflectivity may be computed by replacing the spatial wavenumber by the corresponding slowness variable and integrating over the frequencies. Seismic imaging and angle dependent reflectivity calculation based on spectral division, according to the present disclosure, can be a beneficial approach in comparison to the full integral solution because it can operate efficiently on individual common seismic source gathers. The angle dependent reflectivity leads to the plane wave reflection coefficient after division by a local unit source wavefield also expressed in plane waves. The angle of incidence is taken between the down-going wave path and the normal to the extrapolation surface. The emergence angle is taken between the reflected wave path and the extrapolation surface normal at the subsurface image level 338 as illustrated at 343.

Figure 4:
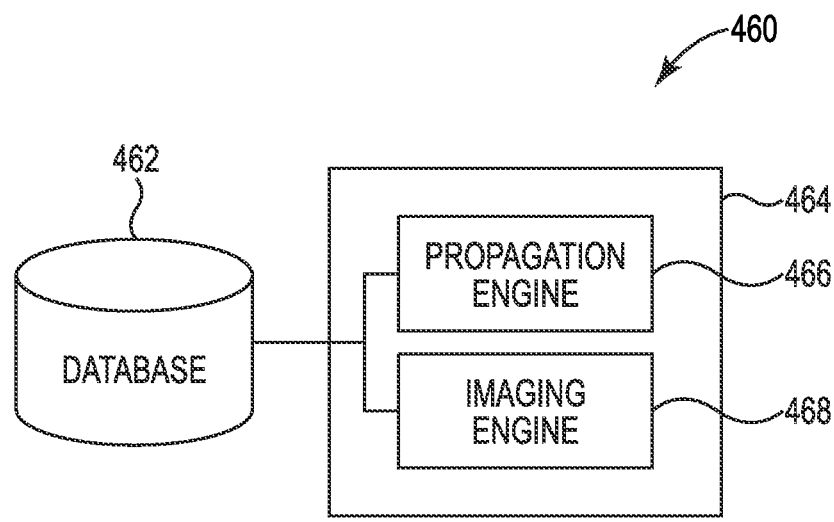
FIG. 4 illustrates a diagram of a system for determination of an impulse response at a subsurface image level.

FIG. 4 illustrates a diagram of a system for determination of an impulse response at a subsurface image level. The system 460 can include a data store 462, a subsystem 464, and/or a number of engines (e.g., propagation engine 466 and/or imaging engine 468) and can be in communication with the data store 462 via a communication link. The system 460 can include additional or fewer engines than illustrated to perform the various functions described herein. The system can represent program instructions and/or hardware of a machine (e.g., machine 570 as referenced in FIG. 5, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, machine-readable medium, etc., as well as hard-wired program such as logic. Hard-wired program instructions can be considered as both program instructions and hardware.

The propagation engine 466 can include a combination of hardware and program instructions that is configured to propagate a source wavefield, comprising a filtered down-going velocity wavefield, forward in time down to a subsurface image level in small depth increments. The propagation engine 466 can propagate a receiver wavefield, comprising an up-going pressure wavefield, backward in time down to the subsurface image level in small depth increments. The depth increments can be small relative to signal content. That is, the depth increments can be sufficiently small such that variation in signal content at adjacent depth increments is sufficiently small to provide a reliable image reconstruction according to the sampling theorem.

In some embodiments, the imaging engine 468 can include a combination of hardware and program instructions that is configured to apply an imaging condition to determine an impulse response at the subsurface image level. In some embodiments, the imaging engine 468 can apply the imaging condition to extract a zero-time lag of the correlation of the source wavefield and the receiver wavefield divided in frequency-wavenumber domain by the autocorrelation of the source wavefield at a particular one of the small depth increments or at each of the small depth increments. Autocorrelation is a cross-correlation of a signal with itself. A cross-correlation is a measure of similarity between two waveforms as a function of a time lag applied to one of them. The zero-time lag of the correlation is where the down-going wavefield and the up-going wavefield are at the same point (coincident) at the subsurface image level, which is the target for seismic imaging. The zero-time lag of the correlation can be extracted for many time sequences. Deconvolution by spectral division can yield complete wavefields with many time samples. In some embodiments, the imaging engine 468 can apply the imaging condition in the frequency-space domain, as described in Equation 2. In some embodiments, the imaging engine 468 can apply the imaging condition in the frequency-wavenumber domain. For example, the imaging condition can be applied to extract the angle dependent reflectivity at the subsurface image level. The imaging engine 468 can obtain a seismic image at the subsurface image level with attenuated propagation effect of an overburden. For example, the propagation effect of the overburden can be internal scattering at the overburden.

Figure 5:
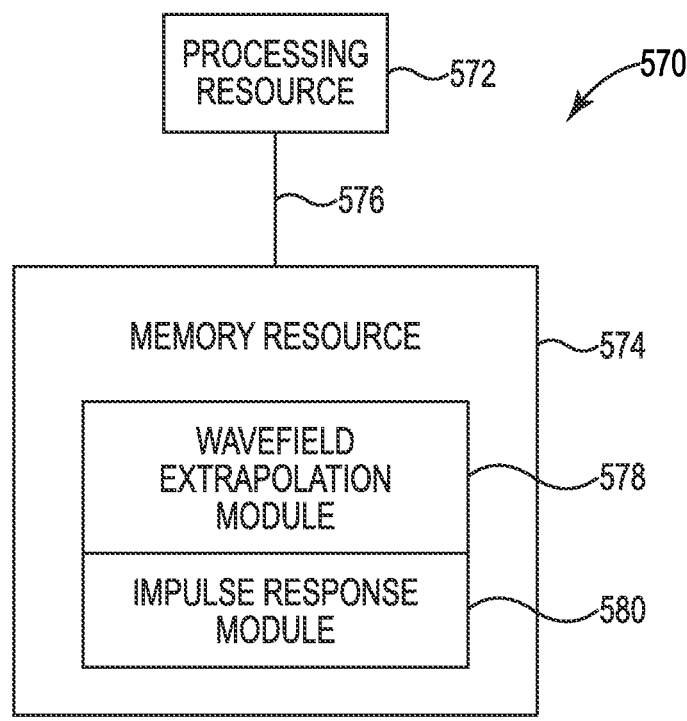
FIG. 5 illustrates a diagram of a machine for determination of an impulse response at a subsurface image level.

FIG. 5 illustrates a diagram of a machine for determination of an impulse response at a subsurface image level. The machine 570 can utilize software, hardware, firmware, and/or logic to perform a number of functions. The machine 570 can be a combination of hardware and program instructions configured to perform a number of functions (e.g., actions). The hardware, for example, can include a number of processing resources 572 and a number of memory resources 574, such as a machine-readable medium or other non-transitory memory resources 574. The memory resources 574 can be internal and/or external to the machine 570, for example, the machine 570 can include internal memory resources and have access to external memory resources. The program instructions, such as machine-readable instructions, can include instructions stored on the machine-readable medium to implement a particular function, for example, an action such as determining an impulse response at a subsurface image level. The set of machine-readable instructions can be executable by one or more of the processing resources 572. The memory resources 574 can be coupled to the machine 570 in a wired and/or wireless manner. For example, the memory resources 574 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 574 can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media.

The processing resources 572 can be coupled to the memory resources 574 via a communication path 576. The communication path 576 can be local or remote to the machine 570. Examples of a local communication path 576 can include an electronic bus internal to a machine, where the memory resources 574 are in communication with the processing resources 572 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 576 can be such that the memory resources 574 are remote from the processing resources 572, such as in a network connection between the memory resources 574 and the processing resources 572. That is, the communication path 576 can be a network connection. Examples of such a network connection can include a local area network, wide area network, personal area network, and the Internet, among others.

As shown in FIG. 5, the machine-readable instructions stored in the memory resources 574 can be segmented into a number of modules 578, 580 that when executed by the processing resources 572 can perform a number of functions. As used herein a module includes a set of instructions included to perform a particular task or action. The number of modules 578, 580 can be sub-modules of other modules. For example, the wavefield extrapolation module 578 can be a sub-module of the impulse response module 580 and/or the wavefield extrapolation module 578 and the impulse response module 580 can be contained within a single module. Furthermore, the number of modules 578, 580 can comprise individual modules separate and distinct from one another. Examples are not limited to the specific modules 578, 580 illustrated in FIG. 5.

Each of the number of modules 578, 580 can include program instructions and/or a combination of hardware and program instructions that, when executed by a processing resource 572, can function as a corresponding engine as described with respect to FIG. 4. For example, the wavefield extrapolation module 578 can include program instructions and/or a combination of hardware and program instructions that, when executed by a processing resource 572, can function as the propagation engine 466 and/or the impulse response module 580 can include program instructions and/or a combination of hardware and program instructions that, when executed by a processing resource 572, can function as the imaging engine 468.

The machine 570 can include a wavefield extrapolation module 578, which can include instructions to extrapolate an up-going pressure wavefield to a subsurface image level. In some embodiments, the instructions to extrapolate the up-going pressure wavefield can include instructions to propagate the up-going pressure wavefield backward in time down to the subsurface image level in small depth increments. The wavefield extrapolation module 578 can include instructions to extrapolate a down-going velocity wavefield to the subsurface image level. In some embodiments, the instructions to propagate the down-going velocity wavefield can include instructions to propagate the down-going velocity wavefield forward in time down to the subsurface image level in the small depth increments. In some embodiments, the wavefield extrapolation module 578 can include instructions to separate a down-going wavefield into a down-going pressure wavefield and the down-going velocity wavefield, for example, before extrapolating the down-going velocity wavefield to the subsurface image level. In some embodiments, the wavefield extrapolation module 578 can include instructions to separate an up-going wavefield into the up-going pressure wavefield and an up-going velocity wavefield.

The machine 570 can include an impulse response module 580, which can include instructions to determine an impulse response at the subsurface image level from a hypothetical seismic source by spectral division of the extrapolated up-going pressure wavefield by the extrapolated down-going velocity wavefield. For example, the impulse response at the subsurface image level can be an angle dependent reflectivity at the subsurface image level. The impulse response module 580 can include instructions to apply a filter to the down-going velocity wavefield. The impulse response module 580 can include instructions to perform spectral division of the extrapolated up-going pressure wavefield by the filtered down-going velocity wavefield. In some embodiments, the instructions to apply the filter can include instructions to apply an iw-filter to the down-going velocity wavefield. In some embodiments, the impulse response module 580 can include instructions to extract a zero-time lag of the correlation between the up-going pressure wavefield and the filtered down-going velocity wavefield at the small depth increments.

In accordance with a number of embodiments of the present disclosure, a geophysical data product may be produced. The geophysical data product may include, for example, an impulse response at a subsurface image level and/or a seismic image at the subsurface image level with attenuated propagation effect of an overburden. Geophysical data, such as data previously collected by seismic receivers, depth sensors, location sensors, etc., may be obtained (e.g., retrieved from a data library) and stored on a non-transitory, tangible computer-readable medium. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. For example, an impulse response can be determined at a subsurface image level by spectral division of an extrapolated up-going pressure wavefield by an extrapolated filtered down-going velocity wavefield from data, for example as it is being measured or after it is being measured, offshore to facilitate other processing of the measured data either offshore or onshore. As another example, a seismic image at the subsurface image level with attenuated propagation effect of an overburden can be obtained from data, for example as it is being measured or after it is being measured, offshore to facilitate other processing of the measured data either offshore or onshore.

Figure 6:
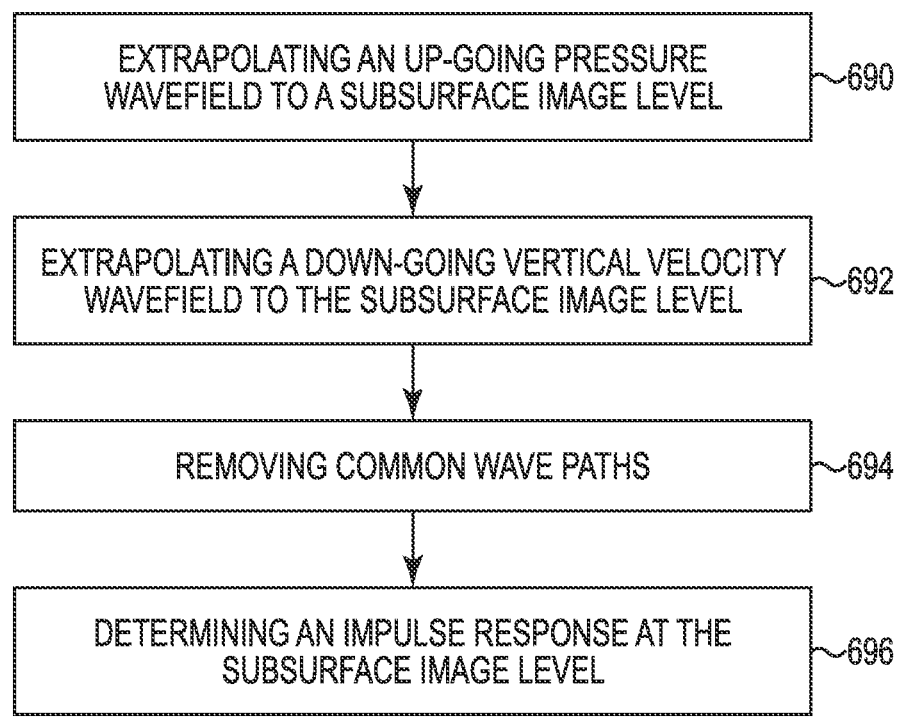
FIG. 6 illustrates a method flow diagram for determination of an impulse response at a subsurface image level.

FIG. 6 illustrates a method flow diagram for determination of an impulse response at a subsurface image level. At block 690, the method can include extrapolating, by a machine, an up-going pressure wavefield to a subsurface image level. At block 692, the method can include extrapolating, by the machine, a down-going velocity wavefield to the subsurface image level.

At block 694, the method can include removing (e.g., filtering), by the machine, common wave paths from the extrapolated up-going pressure wavefield and the extrapolated down-going velocity wavefield. In some embodiments, removing the common wave paths can include removing (e.g., filtering) a source wavefield and internal scattering at an overburden. The overburden can include salt. In some embodiments, removing the common wave paths can include removing (e.g., filtering) sea surface scattering. In some embodiments, removing the common wave paths can include applying an inversion of a Fredholm integral equation that defines a seismic source-receiver reciprocity relationship between an actual state with the common wave paths and a hypothetical state without the common wave paths.

At block 696, the method can include determining, by the machine, an impulse response at the subsurface image level based on the extrapolated up-going wavefield and the extrapolated down-going wavefield without the removed common wave paths. In some embodiments, determining the impulse response can yield an angle dependent reflectivity at the subsurface image level. The angle can be an angle between a source wave path and a receiver wave path at the subsurface image level.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium storing instructions executable by a processing resource to cause the machine to:
   extrapolate, by the processing resource, an up-going pressure wavefield to a subsurface image level;
   extrapolate, by the processing resource, a down-going velocity wavefield to the subsurface image level;
   wherein the up-going pressure wavefield and the down-going velocity wavefield are based in part on a measurement by a receiver;
   determine, by the processing resource, an impulse response at the subsurface image level from a hypothetical seismic source, comprising a representation of a seismic source at the subsurface image level where a seismic source does not exist, by applying an inversion of a Fredholm integral that defines a seismic reciprocity relationship between an actual state and a hypothetical state; and
   generate a seismic image using the impulse response, the seismic image being indicative of a presence of hydrocarbons or a reservoir at the subsurface image level.

2. The medium of claim 1, wherein the instructions to determine the impulse response comprise instructions to:
   apply a filter to the down-going velocity wavefield; and
   perform spectral division of the extrapolated up-going pressure wavefield by the filtered down-going velocity wavefield in a frequency-wavenumber domain.

3. The medium of claim 1, wherein including instructions to apply $i\omega$ to the down-going velocity wavefield.

4. The medium of claim 1, wherein the instructions to extrapolate the up-going pressure wavefield comprise instructions to propagate the up-going pressure wavefield backward in time down to the subsurface image level in depth increments such that variation in signal content at adjacent depth increments is sufficient to provide reliable image reconstruction.

5. The medium of claim 4, wherein the instructions to extrapolate the down-going velocity wavefield comprise instructions to propagate the down-going velocity wavefield forward in time down to the subsurface image level in the depth increments.

6. The medium of claim 1, including instructions to separate a down-going wavefield into a down-going pressure wavefield and the down-going velocity wavefield.

7. The medium of claim 1, including instructions to separate an up-going wavefield into the up-going pressure wavefield and an up-going velocity wavefield.

8. The medium of claim 1, wherein the impulse response at the subsurface image level comprises a reflectivity at the subsurface image level.

9. A method, comprising:
   extrapolating, by a machine, an up-going pressure wavefield to a subsurface image level;
   extrapolating, by the machine, a filtered down-going velocity wavefield to the subsurface image level;
   wherein the up-going pressure wavefield and the filtered down-going velocity wavefield are based in part on a measurement by a receiver;
   removing, by the machine, common wave paths from the extrapolated up-going pressure wavefield and the extrapolated filtered down-going velocity wavefield;
   wherein removing the common wave paths comprises applying an inversion of a Fredholm integral that defines a seismic reciprocity relationship between an actual state with the common wave paths and a hypothetical state without the common wave paths;
   determining, by the machine, an impulse response at the subsurface image level based on the extrapolated up-going wavefield and the extrapolated filtered down-going wavefield without the removed common wave paths; and
   generating a seismic image using the impulse response, the seismic image being indicative of a presence of hydrocarbons or a reservoir at the subsurface image level.

10. The method of claim 9, wherein removing the common wave paths includes removing a source wavefield and internal scattering at an overburden.

11. The method of claim 9, wherein removing the common wave paths includes removing sea surface scattering.

12. The method of claim 9, wherein determining the impulse response yields a reflectivity at the subsurface image level.

13. A system, comprising:
   a processing resource; and
   a non-transitory machine-readable medium storing instructions executable by the processing resource to:
      propagate a source wavefield, comprising a filtered down-going velocity wavefield, forward in time down to a subsurface image level in depth increments; and
      propagate a receiver wavefield, comprising an up-going pressure wavefield, backward in time down to the subsurface image level in the depth increments such that variation in signal content at adjacent depth increments is sufficient to provide reliable image reconstruction;
      wherein the source wavefield and the receiver wavefield are based in part on a measurement by a receiver;
      determine an impulse response at the subsurface image level by applying an inversion of a Fredholm integral that defines a seismic reciprocity relationship between an actual state and a hypothetical state; and generate a seismic image at the subsurface image level, using the determined impulse response, with attenuated propagation effect of an overburden, the seismic image being indicative of a presence of hydrocarbons or a reservoir at the subsurface image level.

14. The system of claim 13, including instructions to extract a zero-time lag of the correlation between the source wavefield and the receiver wavefield divided by an autocorrelation of the source wavefield at a particular one of the depth increments.

15. The system of claim 14, including instructions to extract the zero-time lag of the correlation between the source wavefield and the receiver wavefield divided by an autocorrelation of the source wavefield at each of the depth increments.

16. The system of claim 14, including instructions to apply the inversion of the Fredholm integral in the frequency-space domain to determine a reflectivity at the subsurface image level.

17. The system of claim 13, wherein the propagation effect of the overburden comprises internal scattering at the overburden.

18. A method of generating a geophysical data product, the method comprising:

obtaining geophysical data;

processing the geophysical data to generate the geophysical data product, wherein processing the geophysical data comprises:
  extrapolating, by a machine, an up-going pressure wavefield to a subsurface image level;
  extrapolating, by the machine a down-going velocity wavefield to the subsurface image level;
  wherein the up-going pressure wavefield and the down-going velocity wavefield are based in part on a measurement by a receiver;
  determining, by the machine, an impulse response at the subsurface image level from a hypothetical seismic source, comprising a representation of a seismic source at the subsurface image level where a seismic source does not exist, by applying an inversion of a Fredholm integral that defines a seismic reciprocity relationship between an actual state and a hypothetical state; and
  generating a seismic image using the impulse response, the seismic image being indicative of a presence of hydrocarbons or a reservoir at the subsurface image level.

19. The method of claim 18, further comprising recording the geophysical data product on a non-transitory machine-readable medium suitable for importing onshore.

20. The method of claim 18, wherein processing the geophysical data comprises processing the geophysical data offshore or onshore.

* * * * *